United States Patent [19]

Graham

[11] 4,126,959

[45] Nov. 28, 1978

[54] ADHESIVE-LINED INSECT CAPTURE DEVICE AND KIT

[76] Inventor: George L. Graham, 161 Venado Way, San Jose, Calif. 95123

[21] Appl. No.: 768,316

[22] Filed: Feb. 14, 1977

[51] Int. Cl.² .............................................. A01M 3/04
[52] U.S. Cl. ........................................................ 43/136
[58] Field of Search ................................ 43/113–117, 43/136, 133–135

[56] References Cited

U.S. PATENT DOCUMENTS

| | | | |
|---|---|---|---|
| 1,087,921 | 2/1914 | Caldwell | 43/115 |
| 2,318,634 | 5/1943 | Robinot et al. | 43/114 |
| 3,449,856 | 6/1969 | Weaver | 43/136 |
| 4,031,654 | 6/1977 | Gray | 43/114 |

FOREIGN PATENT DOCUMENTS 788,392 10/1935 France ........................................ 43/136

Primary Examiner—Ronald E. Suter
Attorney, Agent, or Firm—Townsend and Townsend

[57] ABSTRACT

An insect capture device which comprises a transparent, dish-shaped retaining member attached to an elongate handle and having a concavity that removably receives and holds a disposable, transparent insert element. The insert element is provided with an exposed hollow surface, the surface of which is coated with a clear, tacky, non-drying adhesive that captures insects coming into contact therewith. The retaining member and retaining element may be constructed so that they are substantially identical in size and shape so that either one may be nested in the other. So constructed the insect capture device can be sold in component form as a kit which would include an attachment for affixing one end of the handle to the retaining member during assembly of the device by the user. If desired, a cover is provided to removably cover the adhesive-coated surface of the insert element when not in use.

8 Claims, 5 Drawing Figures

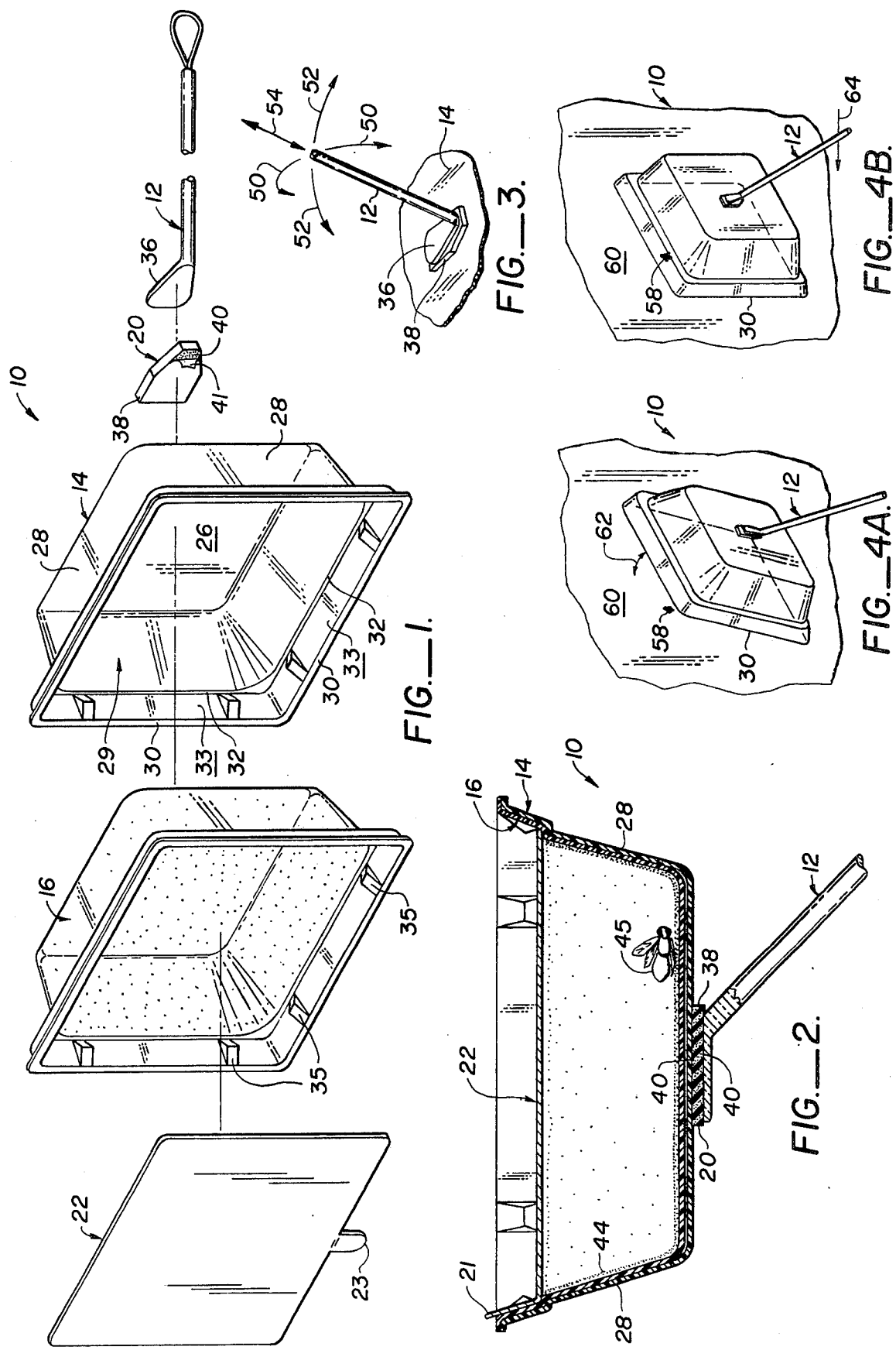

ADHESIVE-LINED INSECT CAPTURE DEVICE AND KIT

BACKGROUND OF THE INVENTION

1. Field of the Invention

The present invention relates to an insect capture device and more particularly to an insect capture device that utilizes a non-drying, tacky, insect-catching adhesive and that is adapted to be readily assembled for use by a user and, therefore, can be provided in kit form.

2. Description of the Prior Art

Mankind has long been plagued by flying pests and insects, such as flies, mosquitoes, gnats and the like. One approach taken to alleviate the inconvenience caused by such insects has been the use of some hand-held instrument, such as a flyswatter or rolled newspaper, to hit an insect which has alighted on a surface of some type. However, the use of these devices can create more problems than they cure. For example, paintings, expensive drapes, and other valuable objects can be damaged when the insect is swatted thereon. Additionally, a swatted insect will tend to leave insect particulate, thereby creating an unsanitary condition unless removed.

Aerosol insect sprays are another means by which a person may relieve himself of the annoyance created by insects. However, such sprays also have drawbacks, including the creation of possible health hazards to humans and animals, possible harmful effects upon delicate fabrics and, again, the existence of the unsanitary conditions that arise from insect remains.

More recently, there have been used insect catchers of the type comprising a transparent structure defining a hollow space, the surface of which is coated with a tacky adhesive. The hollow is placed over the insect and, when the insect takes to flight, it comes into contact with the adhesive and becomes trapped therein. Representative examples of such devices are found in U.S. Pat. Nos. 3,449,856 and 2,437,447.

While such adhesively lined insect catching devices have been found to be generally more effective than flyswatters and insect sprays, several difficulties have been encountered which affect their use in a practical sense. For example, the handle of some of these devices is constructed to lie generally coplanar with the adhesive-lined surface. As a result, use of the device can, at times, be quite difficult if the insect has alighted on a ceiling or some similarly hard-to-reach surface. Even those devices which use a cup-shaped, adhesive-lined member to which a handle is angularly attached are found to be wanting; the outer margin surrounding the adhesive-coated surface is difficult to place flush with the surface upon which the insect has alighted. As a result, a gap produced between the device and surface creates an avenue of escape which the insect may use to the chagrin and frustration of the user.

Finally, and perhaps most importantly, most known devices of this type are, for the most part, economically impractical. Their cost of manufacture has been a major factor in keeping devices of this nature off the commercial market. Thus, insofar as is known, efforts to design an economical, lightweight, practical insect capture device, devoid of the limitations discussed, have not met with success to date.

SUMMARY OF THE INVENTION

The present invention comprises a lightweight, insect capture device which is inexpensive to fabricate, simple to use, and highly effective in capturing and removing insects that may happen to alight upon the surface of an expensive and/or delicate object without damage to the object.

The invention generally includes a thin, transparent, dish-shaped insert element which is removably nested into a similarly shaped, transparent retaining member, which has an elongate handle attached thereto. The concave surface of the insert element is coated with a tacky, non-drying adhesive substance which, when contacted by an insect, captures and holds the insect thereto. A cover is provided that removably covers the exposed adhesive surface of the insert, when not in use.

Both the insert element and retaining member are of molded, unitary construction formed of a thin, yieldable, resilient, transparent plastic material. Preferably, they are both of identical shape and size such that either one may nest in the concave hollow of the other. This construction allows their use in a kit containing the component parts of the insect capture device of the present invention, so that the device may be assembled by a user.

Thus, the kit will include at least two substantially identical, dish-shaped structures of molded, unitary construction formed of a thin, transparent, flexible plastic material, an elongate handle, apparatus for attaching the handle to one of the structures, and a quantity of clear, non-drying, adhesive for coating the concave surface of the other structure. The dish-shaped structures are designed so that either one may be nested in the other and it is only when the handle is attached to one that the retaining member is defined; and, similarly, applying a coat of the adhesive to the concave surface of another of the structures thereby defines the insert. As may now be evident, a number of advantages are achieved by the present invention. First, providing an insert element and retaining member of substantially identical construction achieves an obvious savings in manufacturing costs; it is always less expense to manufacture a number of identical elements, as opposed to a number of elements of different design.

An economic advantage is also obtained by providing the present invention in kit form for assembly by the user, thereby avoiding assembly costs. Additionally, the particular construction of the structures which define the retaining member and insert element allows them to be nested together in a compact stack. Thus, an economical advantage is obtained by minimizing packaging costs.

An advantage in the efficiency with which the present invention captures an insect that has alighted on a particular surface is obtained over that heretofore known in the prior art. Specifically, the elongate handle is attached to the approximate center of the back, outer surface of the retaining member of the device so that the handle forms an acute angle with a line tangent with the point of attachment. This method of affixing the handle to the retaining member, together with the flexibility and resiliency of the retaining member and insert element nested therein, allows the user with very little effort to dispose the outer margin surrounding the concave surface of the insert flush with the surface holding the insect to thereby securely entrap the insect. This feature will be explained more fully below.

A number of hygienic advantages are also obtained. The insert element is constructed so that it is disposable and may, therefore, be thrown away at little cost. Thus, the user is able to rid himself of the insect carcass and particulate.

For a fuller understanding of the nature and advantage of the present invention, reference should be had to the ensuing detailed description which, when taken in conjunction with the accompanying drawings, will provide such understanding.

BRIEF DESCRIPTION OF THE DRAWINGS

FIG. 1 is an exploded perspective view illustrating the fly capture device of the present invention;

FIG. 2 is a side sectional view of the retaining member and insert element of the present invention and illustrating placement of a cover thereon;

FIG. 3 is a partial perspective view illustrating attachment and freedom of movement of the handle; and FIGS. 4A-4B are perspective views of the invention illustrating its use to capture an insect.

DETAILED DESCRIPTION OF THE DRAWINGS

Turning now to the drawings, an insect capture device, generally designated by reference numeral 10, includes a handle 12, retaining member 14, a double-sided attachment adhesive 20 for attaching the handle to the retaining member, and insert element 16. If desired, a cover 22 is provided.

The basic structure of the retaining member 14 and insert element 16 are substantially identical and, therefore, a discussion of the size, shape, and construction of the retaining member will apply equally to the insert element. The retaining member is a box-like, unitary structure formed of a generally planar bottom 26 and, integrally attached to the outer margins of the bottom, wall sections 28. The wall sections extend generally lateral of the bottom to thereby define an inner concave space 29 that terminates in a planar, radial extending flange 30. The wall sections 28 preferably formed an obtuse angle with the bottom 26 so that space 29 opens outward, thereby being adapted to receive, in nesting fashion, insert element 16, as illustrated in FIG. 2.

Separating each wall section 28 from flange 30 is a shoulder 32 that extends circumferentially around the wall sections of the retaining member.

It is presently contemplated that the retaining member 14 as well as the insert element 16, will be constructed from a thin, transparent, resilient plastic material, approximately 11 mils thick. Such a material can be quickly and inexpensively formed from sheets using vacuum-molded techniques. In fact, there is presently available an item that is used as a cover for produce boxes containing fruit, vegetables and the like, that is ideally suited for use as the retaining member and insert element of the present invention. This item, which is fabricated from a thin, transparent plastic, is commercially available from A & E Plastics of Industrial, California.

The handle 12 is a generally elongate rod having a somewhat flattened mounting head 36 integral with and attached to one end of the rod. The opposite end has affixed thereto a small loop or ring 38 so that, when assembled, the insect capture device 10 may be hung from a peg or the like for storage. It is presently contemplated that the handle 12 will also be transparent and will be fabricated from acrylic plastic.

The handle 12 is mounted to the outer surface of the bottom 26 of the retaining member 14 by any appropriate means, such as gluing or the like. However, the contemplated use of lightweight materials to fabricate the insert element and retaining member allows the use of a double-faced foam tape. Thus, attachment adhesive 20 comprises a thin, polyethylene material 38 whose broad, opposed outer surfaces support an adhesive material 40. Attachment adhesive 20 may be fabricated from professional grade mounting tape, such as that manufactured by MBK Enterprises of Chatsworth, California, and sold under the trademark, GRIP-TIGHT. Preferably, for reasons that will be noted below, the handle is attached to the retaining member 14, approximately in the center of the bottom 26. It is presently contemplated that, when attached, handle 12 will form an acute angle of approximately 30°-35° with the planes of bottom 26 of the retaining member. Not attaching the handle coplanar with flange 30 allows the user to more easily reach and catch insects that are resting on hard to reach and out of the way surfaces. Furthermore, the preferred length of handle 12 will be approximately 16 inches. This length allows persons of small stature to use the device to capture insects in rooms having 8-foot ceilings.

The insert element 16 is provided with a thin coating of clear, non-drying, tacky adhesive substance 44, which covers the inner surface of the bottom 26 and side sections 28 to a point just below the shoulder 32. Upon contact with the adhesive 44, an insect 45 (FIG. 2) is captured by the adhesive and remains so until the insert element is disposed of. In addition to possessing insect capturing qualities, adhesive 44 is preferably non-toxic, non-flowing, and odorless. An adhesive possessing all the qualities required is commercially available from H. B. Fuller of Hayward, California, and is identified by them as Formula S.F. 858.

To protect the adhesively lined interior surface of the retaining member 16, a cover 22 is provided. Cover 22 is formed from a thin, planar sheet that is shaped and dimensioned so that it may be received by the opening defined by rim 33 and be supported, spaced from the adhesively lined interior surface of the insert element, by the shoulder 32, as illustrated in FIG. 2. Preferably, cover 22 is opaque so that the cover also removes from sight any insects that may be caught by the adhesive substance 44. Tab 23 is provided cover 22 to effect removal thereof from the insert member.

Inwardly projecting protrusions 35 are formed in rim 33 to aid in fitting and holding cover 22 snugly to the supporting shoulder 32 of the insert element. As the Figures illustrate, protrusions 35 are triangularly shaped to allow the cover to be fitted in and removed from the insert element with relative ease.

Assembly of the insect capture device 10 of the present invention requires nothing more than affixing the handle 12 to the retaining member 14 and inserting or nesting the adhesively lined insert member 16 into the space 29 of the retaining member. So assembled, there is created an extremely lightweight, easy to use device for trapping and collecting insects.

In use, when assembled as described above, the concave adhesively lined insert 16 (held within the retaining member) is placed over the surface upon which the insect has alighted. It is believed that insects, such as flies and the like, have difficulty discerning subtle changes in shade. Thus, a transparent object, such as the insect capture device 10 of the present invention, may easily be brought within close proximity of and over the insect without causing it to take to flight. When it does take to flight, it comes into contact with the clear, tacky adhesive 44, and becomes caught therein. Any desired number of insects may be caught in this manner at which time the insert element 16 may be removed from the retaining member 14, disposed of, and a fresh insert element placed in the retaining member.

Having described the structure, component parts, and use of the insect capture device 10 of the present invention, it is beneficial at this point to note several advantageous features thereof. As pointed out above, it is preferred that the material from which retaining member 14 and insert element 16 be a thin, resilient plastic. The elastic property of such material provides handle 12, when attached to the retaining member bottom 26 and approximately in the center thereof, with some freedom of movement relative to the retaining member. In effect, as FIG. 3 illustrates, handle 12 has three degrees of movement — two transverse degrees, illustrated by arrows 50 and 52, and a degree of movement along the longitudinal of handle 12, illustrated by arrow 54.

This freedom of movement of handle 12, relative to retaining member 14, obtains a particular advantage of a user attempting to cover and trap an insect that has alighted on a planar but hard to reach surface — such as, for example, on a wall near the ceiling. This feature can best be explained, with reference to FIGS. 4A and 4B, as follows: Assume insect 58 has alighted on a wall surface 60 at a point high upon the wall, possibly near the ceiling. A user, holding the free end of handle 12 of the insect capture device, would attempt to place the insert/retainer combination over the insect, but due to the height and position of the insect 58 on wall surface 60, a gap (illustrated by arrow 62) would be left between flange 30 and the wall surface. This gap would allow the insect to escape. However, because of the freedom of movement of handle 12 relative to the retaining member-insert element combination, the user need only exert a slight force on the handle in the direction (arrow 64) of the wall surface 60 to cause a pivoting of the retaining member and delete the gap. The insect becomes trapped within the space 29 of the insert element 16 and, when the insect takes to flight and contacts adhesive 44, becomes securely attached therein.

A further advantageous feature of the present invention resides in the fact that due to the preferred light weight of the retaining member 14 and insert element 16, due to the preferred fabrication materials used, attachment of handle 12 to retaining member 14 may be effected with commercially available, double-faced mounting tape. This, in turn, allows all the component parts of the insect capture device 10 to be sold in kit form to be assembled by the user — thereby achieving significant savings in assembly costs.

The kit would include two or more of the box-like structures that would be used as the retaining member 14 (so defined when handle 12 is attached to one of the structures), insert element 16, the non-drying, clear adhesive 44 (contained in an appropriate receptacle), handle 12, attachment adhesive 20, and cover 22. The user would assemble the insect capture device of the present invention from this kit by removing the protective paper sheets 41 (FIG. 1) from the adhesive faces 40 of attachment adhesive 20. The attachment adhesive would then be used to affix the head portion 36 of handle 12 to the bottom 26 of the retaining member. The clear, non-drying adhesive 44 would be applied, by the user, to the inner surface defined by space 29 of insert element 16. The insert element is then, if not before, inserted into the retaining member as illustrated in FIG. 2. If desired, the cover 22 may be inserted to cover the adhesively lined interior of the insert.

As will now be apparent, insect capture devices fabricated in accordance with the teachings of the present invention are relatively inexpensive to manufacture, simple to assemble and manipulate, sufficiently small and lightweight in size to conveniently store, and highly effective in removing insects in a wide variety of applications. Moreover, the substantial identical construction of the box-like units used to form the insert element and retaining member can insure lower manufacturing costs. In addition, the particular flexibility of the material used to form the insert and retainer, thereby allowing a large degree of freedom of movement of handle 12 when attached to the retainer, allows the rim of the device to be placed flush and firmly upon a planar surface to insure entrapment of an insect thereon. In addition, the particular structure described herein makes the device uniquely adapted for use as a kit supplied to the user who may assemble the device himself.

While the above provides a full and complete disclosure of the preferred embodiment of the invention, various modifications, alternate constructions and equivalents may be employed without departing from the true spirit and scope of the invention. For example, other means of attaching the handle to the retaining member may be employed, if desired, such as a suction cup device.

Therefore, the above description and illustrations should not be construed as limiting the scope of the invention, which is defined by the appended claims.

What is claimed is:

1. An insect capture device, comprising:
 a pair of structures, each of the structures being substantially identical in size, shape and configuration, each being defined by a substantially planar base portion, and each having side walls connected to the outer margin of and surrounding the base portion and projecting laterally therefrom forming a hollow inner space, each of the structures being of integral, molded, unitary construction and each being formed of yieldable, resilient, transparent material, each of the structures being conformable to, removably insertable and held in the inner space of the other of the structures, a first of the structures being inserted in the inner space of a second of the structures;
 a layer of generally transparent, tacky, non-drying adhesive coating the surface of the inner space of the first of the structures; and
 a handle angularly affixed to an outer surface of the base portion of the second of the structures.

2. The insect capture device of claim 1, wherein the structures are fabricated from a thin, plastic material.

3. The insect capture device of claim 2, wherein the handle is an elongate member having an end affixed proximate the center of the base portion outer surface of the second of the structures.

4. The insect capture device of claim 3, wherein the handle is angularly attached to the base portion to form an acute angle there with that is within the range of 30° to 35°.

5. The insect capture device of claim 4, wherein the hollow inner space of each of the structures formed by the sidewalls is rectangular.

6. An insect capture device according to claim 1, wherein the non-drying adhesive is non-toxic.

7. An insect capture kit having component parts capable of assembly by a user, the kit comprising the combination of:
- a retaining member having a base portion and wall portions projecting laterally from the base portion, the wall portions being attached to and integral with the outer margins of and surrounding the bottom portion to define a cavity therein;
- an insert member receivable within the cavity of the retaining member through the open extremity of the cavity; the insert member having an exposed surface that defines an insect-receiving void bounded by a planar outer rim when so inserted in the cavity of the retaining member, the retaining and insert members each being substantially identical in size, shape and configuration, each being of integral, unitary, molded construction and each being formed of yieldable, resilient, transparent plastic material;
- a tacky, non-drying, adhesive substance capable of being applied to and coating the exposed surface of the insert member;
- an elongate handle formed of a generally bendable material; and
- attachment means positionable between the handle and the retaining member to attach the handle thereto.

8. The insect capture kit of claim 7, including a cover removably attached to the insert member and covering the insect-receiving void of the insert member to thereby protect the adhesive coated surface of said void when the kit has been assembled.

* * * * *